United States Patent
Kruglick (10) Patent No.: US 10,154,022 B2
(45) Date of Patent: *Dec. 11, 2018

(54) AUTHENTICATION SERVER AND METHOD TO ENABLE CONTENT TO BE PUSHED TO A CURRENTLY UTILIZED DEVICE AMONG CLIENT DEVICES

(71) Applicant: EMPIRE TECHNOLOGY DEVELOPMENT LLC, Wilmington, DE (US)

(72) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/361,622

(22) Filed: Nov. 28, 2016

(65) Prior Publication Data

US 2017/0078274 A1 Mar. 16, 2017

Related U.S. Application Data

(63) Continuation of application No. 13/810,496, filed as application No. PCT/US2012/050715 on Aug. 14, 2012, now Pat. No. 9,525,588.

(51) Int. Cl.
*G06F 13/00* (2006.01)
*H04L 29/06* (2006.01)
(Continued)

(52) U.S. Cl.
CPC .......... *H04L 63/0815* (2013.01); *H04L 41/00* (2013.01); *H04L 63/068* (2013.01); *H04L 63/10* (2013.01); *H04L 67/26* (2013.01)

(58) Field of Classification Search
CPC ................ G06F 21/6218; H04L 29/06; H04L 29/08072; H04L 29/0809; H04L 29/08144;
(Continued)

(56) References Cited

U.S. PATENT DOCUMENTS 7,188,360 B2  3/2007  Gerdes et al.
8,256,664 B1  9/2012  Balfanz et al.
(Continued)

FOREIGN PATENT DOCUMENTS

WO   2012071168 A2   5/2012

OTHER PUBLICATIONS

"Facebook for Websites—Facebook Developers," accessed at https://web.archive.org/web/20120502014037/http://developers.facebook.com/docs/guides/web/, accessed on Oct. 25, 2016, pp. 9.
(Continued)

*Primary Examiner* — Robert B Harrell (57) ABSTRACT

In one example, a system includes an authentication server that is configured to receive an authentication request for a primary application, provide time-based authentication credentials for the primary application, receive an updated authentication request for the primary application, wherein the updated authentication request includes a client device identifier (ID) corresponding to a client device from which the authentication request is received, and transmit the client device ID; the system may further include a push server that is configured to receive the transmitted client device ID, and push an update to the client device having the client device ID.

19 Claims, 5 Drawing Sheets

(51) Int. Cl.
*H04L 12/24* (2006.01)
*H04L 29/08* (2006.01)

(58) Field of Classification Search
CPC ......... H04L 41/00; H04L 63/08; H04L 63/10;
H04L 63/068; H04L 63/102; H04L
63/0815; H04L 67/26; H04W 12/06
USPC ..................................... 709/225, 231; 726/4
See application file for complete search history.

(56) References Cited

U.S. PATENT DOCUMENTS

| | | | |
|---|---|---|---|
| 8,613,055 | B1 | 12/2013 | Tomilson et al. |
| 2003/0163569 | A1 | 8/2003 | Panasyuk et al. |
| 2003/0236991 | A1 | 12/2003 | Letsinger |
| 2005/0081044 | A1 | 4/2005 | Giles et al. |
| 2006/0048213 | A1 | 3/2006 | Cheng et al. |
| 2006/0242065 | A1 | 10/2006 | Jogand-Coulomb et al. |
| 2007/0124393 | A1 | 5/2007 | Maes |
| 2007/0244987 | A1 | 10/2007 | Pedersen et al. |
| 2008/0133708 | A1 | 6/2008 | Alvarado et al. |
| 2008/0134295 | A1 | 6/2008 | Bailey et al. |
| 2009/0002333 | A1 | 1/2009 | Maxwell et al. |
| 2009/0112937 | A1 | 4/2009 | Campbell et al. |
| 2010/0077208 | A1 | 3/2010 | Appiah et al. |
| 2010/0138761 | A1 | 6/2010 | Barnes |
| 2011/0026704 | A1 | 2/2011 | Connelly et al. |
| 2011/0029670 | A1 | 2/2011 | Klein et al. |
| 2011/0202988 | A1 | 8/2011 | Otranen et al. |
| 2011/0307403 | A1 | 12/2011 | Rostampour et al. |
| 2012/0054840 | A1 | 3/2012 | Gupta |
| 2012/0117626 | A1 | 5/2012 | Yates et al. |
| 2012/0144452 | A1 | 6/2012 | Dyor et al. |
| 2012/0233246 | A1 | 9/2012 | Guemez |
| 2012/0240214 | A1 | 9/2012 | Ogura et al. |
| 2012/0254957 | A1 | 10/2012 | Fork et al. |
| 2012/0278854 | A1 | 11/2012 | Ton et al. |
| 2012/0311095 | A1 | 12/2012 | Rahardja et al. |
| 2013/0047034 | A1 | 2/2013 | Salomon et al. |
| 2013/0254308 | A1 | 9/2013 | Rose et al. |
| 2013/0326606 | A1 | 12/2013 | Kelly et al. |
| 2013/0346589 | A1 | 12/2013 | Leshko et al. |

OTHER PUBLICATIONS

"40% of Tablet and Smartphone Owners Use Them While Watching TV—Nielsen Wire," accessed at https://web.archive.org/web/20120615120232/http://blog.nielsen.com/nielsenwire/online_mobile/40-of-tablet-and-smartphone-owners-use-them-while-watching-tv, dated Oct. 13, 2011, pp. 3.

"Oauth—Wikipedia," accessed at https://web.archive.org/web/20120724163731/https://en.wikipedia.org/wiki/OAuth, last modified on Jul. 21, 2012, pp. 5.

"OAuth 2.0—OAuth," accessed at https://web.archive.org/web/20160728153405/http://oauth.net/2/, accessed on Oct. 25, 2016, pp. 5.

International Search Report and Written Opinion for International Application No. PCT/US2012/050715 dated Nov. 2, 2012, pp. 9.

Lytle, T., "Get Pushy with a Few Real-time APIs," accessed at https://web.archive.org/web/20120501133200/http://blog.programmableweb.com/2012/02/21/get-pushy-with-a-few-real-time-apis, dated Feb. 21, 2012, pp. 4.

Morris P., "How to Receive Push Notifications From iPhone and iPad on Your Mac or Windows PC—Redmond Pie," accessed at https://web.archive.org/web/20120720073900/http://www.redmondpie.com/how-to-receive-push-notifications-from-iphone-and-ipad-on-your-mac-or-windows-pc, dated Mar. 16, 2012, pp. 5.

Takashio, K., et al., "A Mobile Agent Framework for Follow-Me Applications in Ubiquitous Computing Environment," IEEE International Conference on Distributed Computing Systems Workshop, pp. 202-207 (Apr. 16-19, 2001).

AUTHENTICATION SERVER AND METHOD TO ENABLE CONTENT TO BE PUSHED TO A CURRENTLY UTILIZED DEVICE AMONG CLIENT DEVICES

CROSS-REFERENCE TO RELATED APPLICATIONS

This application is a Continuation Application under 35 U.S.C. § 120 of U.S. patent application Ser. No. 13/810,496, filed on Jan. 16, 2013, now issued as U.S. Pat. No. 9,525,588, which is the U.S. National Stage filing under 35 U.S.C. § 371 of International Application No. PCT/US12/50715, filed on Aug. 14, 2012. The disclosures of both U.S. patent application Ser. No. 13/810,496 and International Application No. PCT/US12/50715 are hereby incorporated herein by reference in their entireties.

TECHNICAL FIELD

The embodiments described herein pertain generally to pushing content to an appropriate client device.

BACKGROUND

The internet-age has spawned the unprecedented development of communication devices. Whereas even in the latter half of the 20th century, it was considered a luxury to have just one computer in a home, it is now common for an individual to have multiple client devices that facilitate web-based communications services. Often, the communications services offered on each of the personal client devices are redundant with respect to the other client devices.

Further, the development trend for web-based, i.e., cloud-based, applications is for content, e.g., messages, notifications, updates, etc., related to such applications to be "push-based." That is, service providers for these applications utilize a push service with push APis (application programming interfaces) for delivering the content to the user's client devices. Thus, when a user is logged onto multiple devices, content is pushed to all devices on which the user is logged on.

SUMMARY

In one example embodiment, a system includes an authentication server that is configured to, at least, receive an authentication request for a primary application, provide time-based authentication credentials for the primary application, receive an updated authentication request for the primary application, wherein the updated authentication request includes a client device identifier (ID) corresponding to a client device from which the authentication request is received, and transmit the client device ID; the system may further include a push server, corresponding to the primary application, that is configured to receive the transmitted client device ID, and push an update, corresponding to the primary application, to the client device having the client device ID.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

In the following detailed description, reference is made to the accompanying drawings, which form a part of the description. In the drawings, similar symbols typically identify similar components, unless context dictates otherwise. Further, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Further still, in the following detailed description, reference is also made to multisite authentication and authorization, which will be referred to as "multisite authentication" throughout. Non-limiting examples of websites and/or web-based applications that implement multisite authentication include Facebook®, Foursquare®, Google®, Microsoft®, LinkedIn®, and other web portals and social networking services. The aforementioned websites and their corresponding web-based applications may be hosted on a client device via a browser or software application, respectively, and both access content via the internet, i.e., "web." Thus, because of such similarities, content-providing websites and web-based applications may be collectively and/or alternatively referred to as "application" or "applications" throughout the present description, unless otherwise specified or further explanation is required.

User authentication implemented on such applications may be utilized by other applications that do not implement multisite authentication. That is, a user identifier (ID) used to authorize a user on a primary application that implements multisite authorization may be delegated to also authorize the same user on a secondary application. According to at least one alternative embodiment, the user ID may be utilized to authorize the user, via an authentication service that may also implement multisite authorization. Thus, on a broader scale, the primary application may be considered to be an authentication service.

Non-limiting examples of multisite authentication protocols utilized by content-providing websites and/or web-based applications, i.e.; applications, such as Facebook®, Foursquare®, Google®, Microsoft®, LinkedIn®, etc., include OAuth (open standard for authorization), OAuth 2.0, OpenID and subsequent versions thereof. By these protocols, when a user first submits a user ID to log onto a primary application that implements multisite authentication, a multisite authentication server corresponding to the primary application supplies, e.g.; a username and password token to one or more secondary applications corresponding to separate service providers. The tokens received from the multisite authentication server may include a parameter indicating the expiration time for the token. Thus, the one or more secondary applications do not have to request or retrieve another authorization token from the multisite authentication server until the token expires. Accordingly, as long as the user remains logged onto his/her respective multisite authentication account, the multisite authentication server works for the one or more secondary applications.

Further, multisite authentication protocols may dynamically and variably set the frequency for the expiration parameter. Whatever frequency is set for the expiration parameter, a multisite authentication server may receive an updated authentication request from a user, which includes at least a client device ID, upon the lapsing of the time set by the expiration parameter.

As described herein, applications, i.e.; websites and/or web-based applications, may be referenced as being of either a "pull" model or a "push" model. Pull applications are known to be applications for which new content, e.g.; messages, notifications, updates, etc., is requested of a web-based server from a website or application running on a client device. Push applications are known to be applications for which new content is pushed to the website or application running on a client device, as the new content is made available, without a request therefore having to be made.

Figure 1:
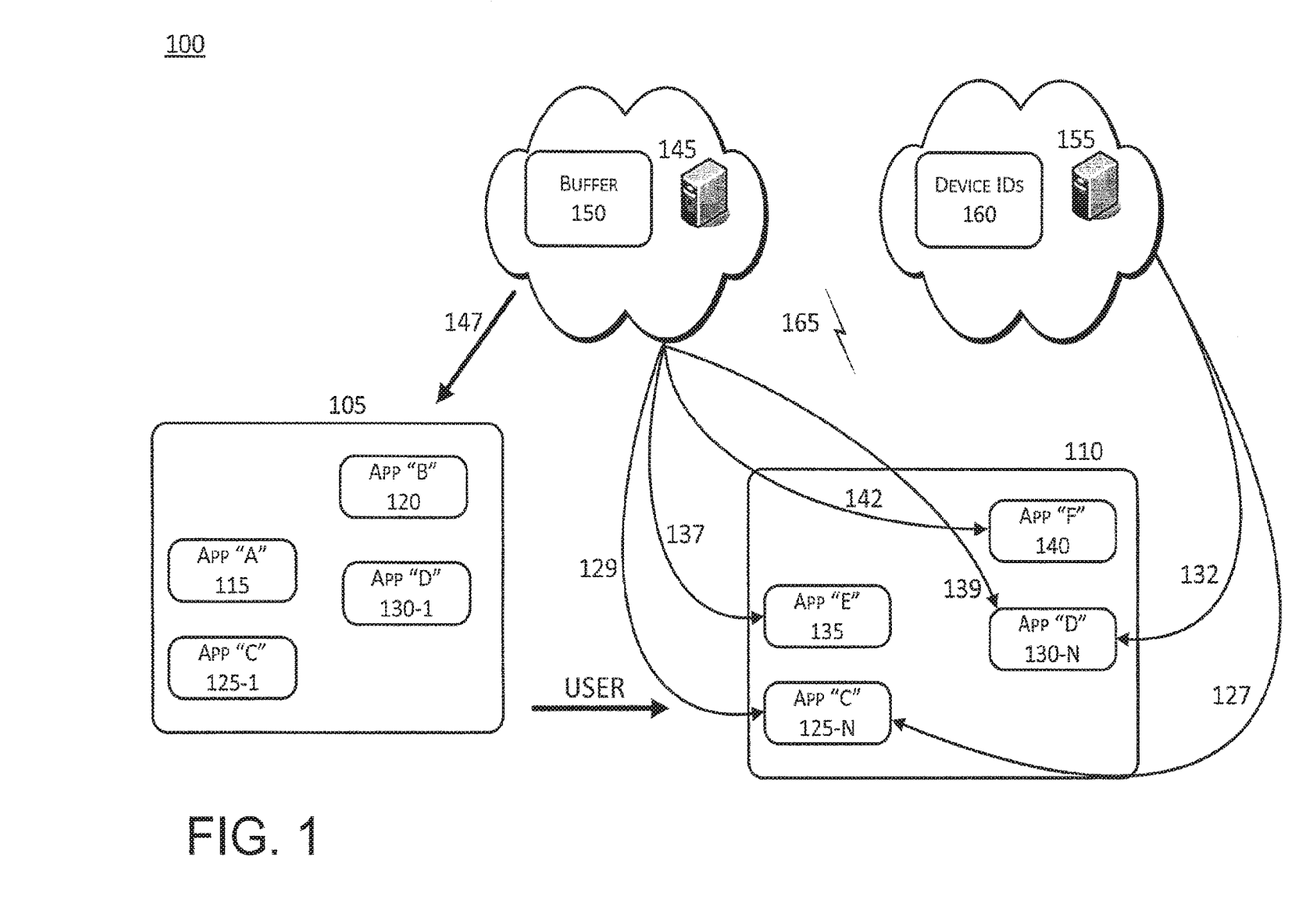
FIG. 1 shows an example system configuration in which applications running on multiple devices may be updated on a currently utilized device, arranged in accordance with at least some embodiments described herein.

FIG. 1 shows an example system configuration 100 in which applications running on multiple devices may be updated on a currently utilized device, arranged in accordance with at least some embodiments described herein. As depicted, configuration 100 includes, at least, client devices 105 and 110; an Application "A" 115, an Application "B" 120, a first instance of Application "C" 125-1, and a first instance of Application "D" 130-1 running or executing (hereinafter referred to as "running") on client device 105; a current instance of Application "C" 125-N, a current instance of Application "D" 130-N, an Application "E" 135, and an Application 'T' 140 running on client device 110; a multisite authentication server 145, having a buffer 150 corresponding thereto; and a push server 155, having a device ID storage 160 corresponding thereto.

Client devices 105 and 110 may respectively refer to a processor-based electronic device on which is hosted an instance of a browser that is logged onto a website and/or an instance of a corresponding web-based application. In accordance with the embodiments described herein, client device 105 may be regarded as a first client device on which a user has registered with at least a primary application that implements multisite authentication and authorization; and client device 110 may be regarded as a currently utilized client device on which the same user has registered with one or more applications for which user registration is based on a token received from a multisite authentication server corresponding to the primary application. Although FIG. 1 depicts only two client devices, both assumed to be under the ownership and/or control of a common user, the embodiments of updating a currently utilized device are not so limited. Rather the embodiments are intended to cover scenarios in which a common user ID utilizes multiple client devices, unbounded by quantity.

Regardless of ownership and/or control, the website or web-based application for Application "A" 115, Application "B" 120, first and current instances of Application "C" 125-1 and 125-N, first and current instances of Application "D" 130-1 and 130-N, Application "E" 135, and Application "F" 140 on client devices 105 and 110, respectively, are authenticated for the same user ID on one or more multisite authentication servers corresponding to the aforementioned primary application.

Further, any one of Application "A" 115, Application "B" 120, Application "C" 125-1, or Application "D" 130-1 hosted on client device 105 may be regarded as the primary application for which the user is authenticated by that primary application submitting at least a user ID to multisite authentication server 145. In that regard, any of the remainder of aforementioned Application "A" 115, Application "B" 120, Application "C" 125, Application "D" 130, Application "E" 135, or Application "F" 140 on either of client devices 105 or 110 may be regarded as a secondary or dependent application for which authentication for the user is implemented utilizing the same user ID on multisite authentication server 145. Further, the primary application for which the user is authenticated is not required to be explicitly running for the secondary or dependent application to utilize the same user ID on multisite authentication server 145. That is, in at least one alternative embodiment, a user does not have to log on to the primary application during a session in order for the primary application to provide multisite authorization.

As depicted in FIG. 1 and described herein, Application "A" 115 and Application "B" 120 hosted on client device 105 are pull applications; and the first instance of Application "C" 125-1 and the first instance of Application "D" 130-1 hosted on client device 105 are push applications. Further, the current instance of Application "C" 125-N and the current instance of Application "D" 130-N hosted on client device 110 are push applications; and Application "E" 135 and Application "F" 140 hosted on client device 110 are pull applications.

Communication link 165 may refer to a communication standard or protocol to implement data transmissions between authentication server 145 and push server 155. Thus, communication link 165 may refer to any hard-wired connection, e.g., fiber optic wires, cable, phone lines, etc., with fiber optic wires being favored in at least some embodiments to handle voluminous data flow to and from authentication server 145 and push server 155, both of which are likely implemented as large-volume data centers. However, in at least some alternative embodiments, communication link 165 may further refer to one or more mobile communications technologies, e.g., GSM, COMA, etc., depending upon the technologies supported by particular wireless service providers to whose services client devices 105 and 110 and the web-based service providers corresponding to authentication server 145 and push server 155 may be assigned or subscribed. Further, communication link 165 may be implemented utilizing non-cellular technologies such as wireless local area network (WLAN or IEEE 802.11), Worldwide Interoperability for Microwave Access (WiMAX™), Bluetooth™, and other analog and digital wireless voice and data transmission technologies.

Client devices 105 and 110 may be configured to transmit and receive data over communication link 165 between authentication server 145 and push server 155 by further connecting to a mobile communications network provided by a wireless service provider (not shown). Client devices 105 and 110 may respectively be implemented as a mobile (or portable) electronic device such as a mobile phone, cell phone, smartphone, personal data assistant (PDA), a personal media player device, an application specific device, or a hybrid device that includes any of the above functions. Client devices 105 and 110 may also respectively be implemented as a personal computer in any of a tablet, laptop computer, or non-laptop computer configuration, which may be connected to the aforementioned mobile communications network or, alternatively, to a wired network.

The aforementioned wireless service provider for implementing communications for client devices 105 and 110 may also be known as a mobile network carrier, wireless carrier, or even cellular company. Regardless of the alternate reference, the wireless service provider may provide services for mobile communications subscribers.

Client devices 105 and 110 may further include an operating system (OS) configuration of various components or modules, e.g., implemented by a framework of hardware, software, firmware, or any combination thereof. Such software and/or firmware may include one or more computer-readable media including but not limited to Application Specific Integrated Circuit (ASIC) or Customer Specific Integrated Circuit (CSIC). The various components or modules corresponding to the aforementioned OS configuration may include, but are not limited to, the aforementioned browser and Application "A" 115, Application "B" 120, Application "C" 125, Application "D" 130, Application "E" 135, and Application "F" 140. However, it is noted that the aforementioned applications may also be implemented separate from the OS on one or more of client devices 105 and 110.

Multisite authentication server 145 may refer to one or more servers hosted by or for a web-based service provider that implements multisite authentication and authorization. The aforementioned web-based service provider may refer to a web- or cloud-based storage and dissemination platform owned and/or operated by a third-party service provider. The web-based service provider may include a framework of hardware, software, firmware, or any combination thereof, to host data services to which subscribers may subscribe or register.

Multisite authentication server 145 may be configured, designed, and/or programmed to receive an authentication request for a user on a primary application, i.e., any of the aforementioned Application "A" 115, Application "B" 120, Application "C" 125-1, or Application "D" 130-1 hosted on client device 105, which implements multisite authentication, provides time-based authentication credentials for the user on the primary application, and further receives updated authentication requests for the user on the primary application when the authentication token expires. Any authentication request, including an initial authentication request and any subsequent updated authentication request for the user on the primary application, may include at least a user ID and a client device identifier (ID) corresponding to the client device from which a current authentication request is received. The client device ID may also be derived from inferred data about a device such as operating system, browser, and/or plugins to "fingerprint" the device without the transmission of a specific declarative device identification ID. The multisite authentication server may be further configured to transmit at least the client device ID, to push server 155.

Buffer 150 may refer to a buffer or memory corresponding to authentication server 145. Buffer 150 may store therein at least client device IDs, e.g., IP addresses, corresponding to the user ID of every user who is currently authenticated on the applications for which multisite authentication server 145 has provided authentication. As described herein, the client device IDs stored in buffer 150 may be utilized to inform push server 155 of the client device ID for client device 110, which is the most recently authorized one of client devices 105 and 110.

Push server 155 may refer to one or more servers hosted by or for a web-based provider that pushes content, e.g., messages, notifications, updates, etc., to a corresponding website or application running on a client device. In accordance with the example embodiments described herein, push server 155 may push web-based content, including messages, notifications, updates, etc., to either of push applications Application "C" and Application "D" on either of client devices 105 and 110.

Push server 155 may be configured, designed, and/or programmed to receive the client device ID, received from authentication server 145, which may be included in the authentication request or subsequent updated authentication request for the user on the primary application, thus identifying client device 110 as the appropriate client device from which the current authentication request is received. Push server 155 may be further configured to then push content, e.g., a message, notification, update, etc., to the appropriate instances of push applications Application "C" 125-N or Application "D" 130-N running on client device 110 identified by the received client device ID.

Device ID storage 160 may refer to a buffer or memory corresponding to push server 155 that pushes content to either or both of instances of push applications Application "C" and Application "D" that are authenticated by multisite authentication server 145. Thus, push server 155 pushes the next message, notification, update, etc., to the instances of push applications Application "C" 125-N or Application "D" 130-N on client device 110 identified as the currently utilized client device by the client device ID most recently received and stored on device ID storage 160.

However, alternative embodiments may contemplate push server 155 pushing the next message, notification, update, etc., to all instances of push applications Application "C" and Application "D," though in distinctive manners so as to reduce or even eliminate any inconvenience to the user caused by redundant content on multiple client devices.

Thus, FIG. 1 shows an example system configuration for updating a currently utilized client device.

Figure 2:
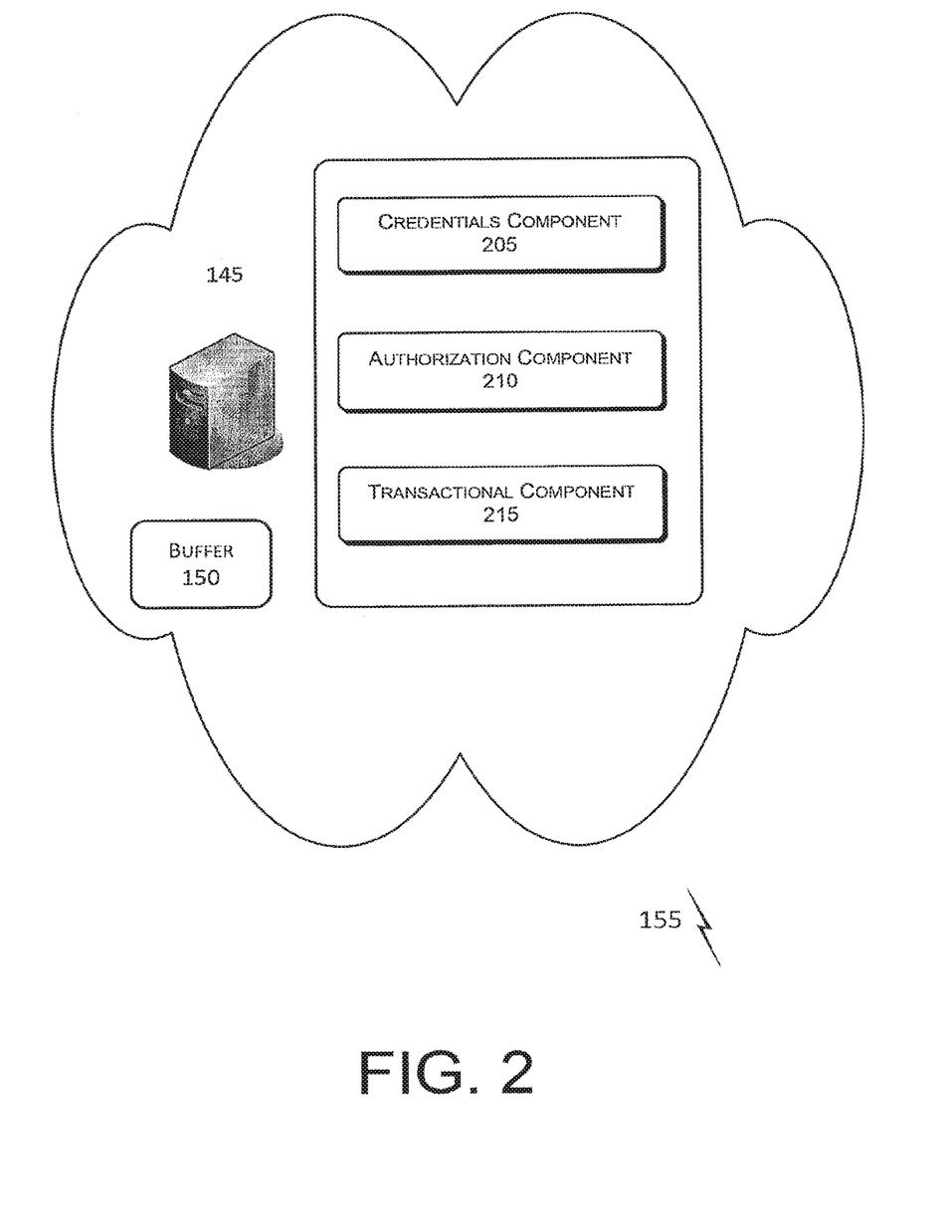
FIG. 2 shows an example configuration of an authentication server that facilitates multisite authentication and authorization, arranged in accordance with at least some embodiments described herein.

FIG. 2 shows an example configuration of authentication server 145 that facilitates multisite authorization and authentication, arranged in accordance with at least some embodiments described herein. As depicted, the example configuration of authentication server 145 includes a credentials component 205, an authorization component 210, and a transactional component 215. This configuration is an example only, and is no intended to be limiting in any manner.

Credentials component 205 may refer to a component or module that is configured, designed, and/or programmed to receive a user authentication request for a primary application. The user authentication request may include, at least, a user ID and a client device ID.

Credentials component 205 may be further configured, designed, and/or programmed to receive updated user authentication requests for the primary application when an instance of the primary application or even one or more secondary applications, for which an authentication token was given, is instantiated, used, or activated on a different client device.

Authorization component 210 may refer to a component or module that is configured, designed, and/or programmed to provide time-based authentication credentials, i.e., tokens, for the user on the primary application and one or more secondary applications, in response to the requests received by credentials component 205.

Transactional component 215 may refer to a component or module that is configured, designed, and/or programmed to transmit the received client device ID, included in a current authentication request, to push server 155.

Transactional component 215 may be further configured, designed, and/or programmed to transmit, to push server 155, client device IDs corresponding to a respective user ID for one or more client devices from which user authentication requests for the primary application have been received. Such client device IDs may be accumulated by quantity, e.g., the five (5) most recent client device IDs, or by time, e.g., the client device IDs received over the past 30 minutes. User IDs and their related client device IDs may also be retrieved actively, e.g. by an access API. Accordingly, push server 155 may be capable of pushing messages, notifications, and updates to all of the identified client devices. However, the present embodiments of updating a currently utilized device may contemplate push server 155 being configured, designed, and/or programmed to push messages, notifications, and updates to the most recently identified client device in an "unread" format and to the previously identified client devices in a "read" format; the latter may occur at a different time.

Thus, FIG. 2 shows an example configuration of a multisite authentication server that facilitates pushing content to only a most recently identified client device or pushing content in a highlighted manner to the most recently identified client device while also pushing the content to previously identified client devices in a deemphasized manner.

Figure 3:
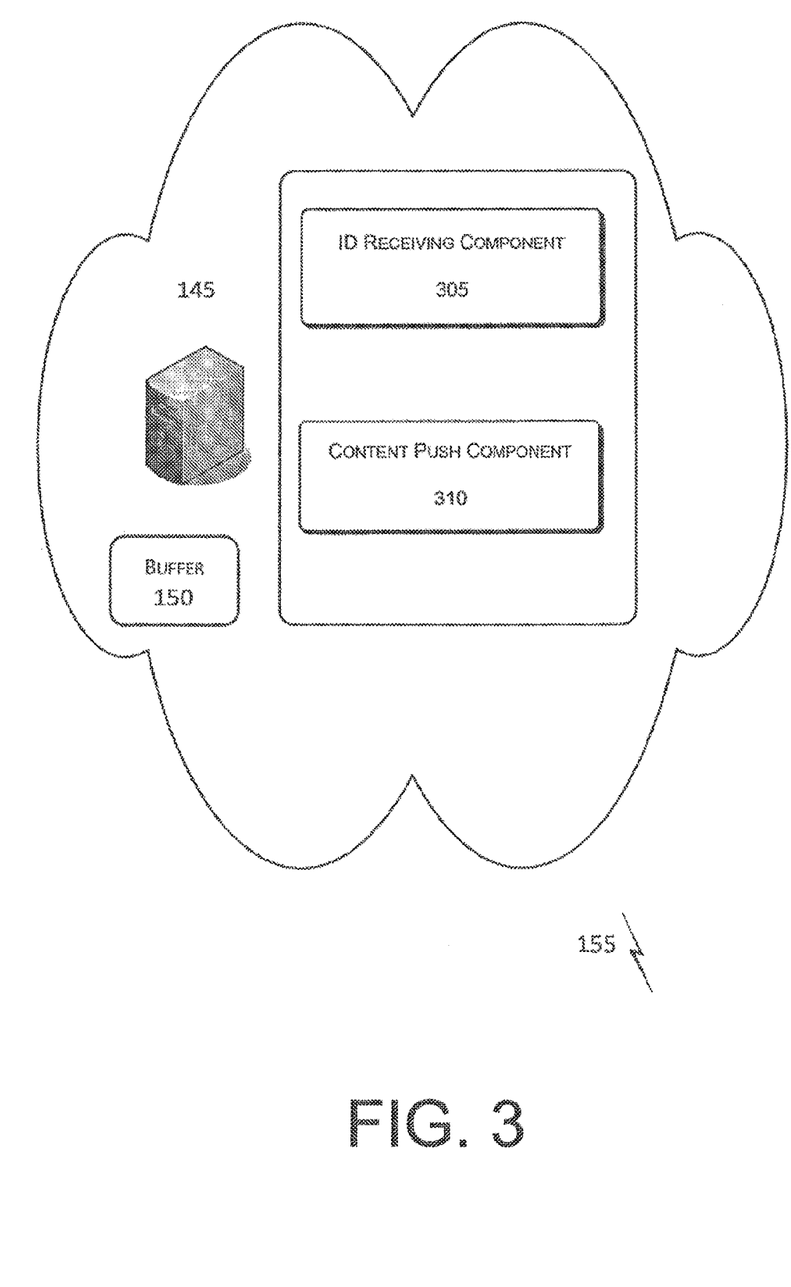
FIG. 3 shows an example configuration of a push server that pushes content to a currently utilized device, in accordance with at least some embodiments described herein.

FIG. 3 shows an example configuration of push server 155 that pushes content to a currently utilized device, in accordance with at least some embodiments described herein. As depicted, the example configuration of push server 155 includes an ID receiving component 305 and a content push component 310. However, this configuration is an example only, and is not intended to be limiting in any manner.

ID receiving component 305 may refer to a component or module that is configured, designed, and/or programmed to receive, by active retrieval or passive message reception, a client device ID from authentication server 145. The active retrieval may refer to a request for a client device ID, via an API. In accordance with the embodiments of updating a currently utilized device, ID receiving component 305 may be configured to receive a client device ID from a most recently identified client device, which is client device 110 in the embodiments described herein. However, in accordance with at least some alternative embodiments, ID receiving component 305 may also receive a client device ID from a previously identified client device, i.e., client device 105, if the client device ID for such client device was received within a predefined quantity of previously identified client devices, e.g., the five (5) most recently identified client devices, or within a predetermined amount of time, e.g., within the past 30 minutes.

Content push component 310 may refer to a component or module that is configured, designed, and/or programmed to push or deliver content, e.g., messages, notifications, and/or updates, to at least the client device for which a client device ID has most recently been received by ID receiving component 305.

Further, content push component 310 may be further configured, designed, or programmed to push content in a highlighted format, e.g., "unread/" to the client device for which a client device has most recently been received, i.e., client device 110; and to at least one client device in a deemphasized manner, e.g., "read" format, for which a client device ID was previously received, i.e., client device 105.

Thus, FIG. 3 shows an example configuration of a push server that pushes content to a currently utilized client device in such a manner that a user thereof is not burdened with content in a redundant format on multiple client devices.

Figure 4:
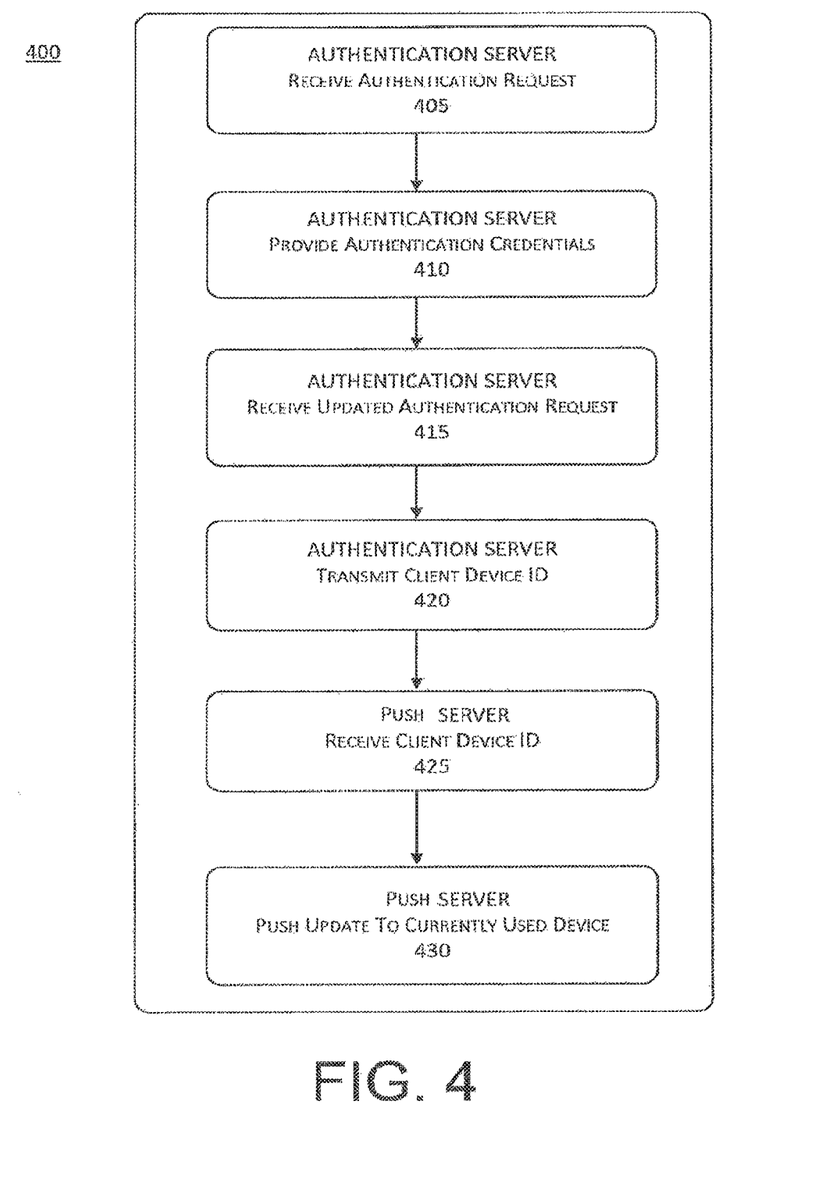
FIG. 4 shows an example configuration of a processing flow of operations for updating a currently utilized device, in accordance with at least some embodiments described herein.

FIG. 4 shows an example configuration of a processing flow 400 of operations for updating a currently utilized device, in accordance with at least some embodiments described herein. As depicted, processing flow 400 includes sub-processes executed by various components that are part of either authentication server 145 or push server 155. Thus, the description of processing flow 400 includes reference to various features and components of configuration 100 shown in FIG. 1. However, processing flow 400 is not limited to such components, as obvious modifications may be made by re-ordering two or more of the sub-processes described here, eliminating at least one of the sub-processes, adding further sub-processes, substituting components, or even having various components assuming sub-processing roles accorded to other components in the following description. Processing flow 400 may include various operations, functions, or actions as illustrated by one or more of blocks 405, 410, 415, 420, 425, and/or 430. Processing may begin at block 405.

Block 405 (Authentication Server: Receive Authentication Request) may refer to credentials component 205 receiving a use authentication request for a corresponding primary application from among Application "A" 115, Application "B" 120, Application "C" 125-1, and Application "D" 130-1, running on client device 105. Processing may proceed to block 410.

Block 410 (Authentication Server: Provide Authentication Credentials ay refer to authorization component 210 providing time-limited or time-logged authentication credentials, i.e., tokens, for the user on, at least, one or more of the secondary applications, in response to the requests received by credentials component 205. If, for example, Application "C" is the primary application that implements multisite authentication via multisite authentication server 145, the user is also authenticated and authorized on secondary applications Application "A" 115, Application "B" 120, and Application "D" 130-1 via Application "C," all of which are given tokens by multisite authentication server 145.

At least some of example embodiments described herein for updating a currently utilized device may contemplate a push application serving as the primary application by which multisite authentication may be implemented. Thus, the embodiments described herein are not to be considered limiting. It is certainly feasible for a pull application, e.g., Application "A" 115 or Application "B" 120, to be implemented as a multisite authentication application. Regardless, processing may proceed to block 415.

Block 415 (Authentication Server: Receive Updated Authentication Request) may refer to credentials component 205 receiving updated user authentication requests for the primary application, e.g., Application "C" 120-N, when an instance of the primary application or even one or more secondary applications, for which an authentication token was given, is instantiated or activated on a different client device.

Consider the depiction of configuration 100 in FIG. 1, by which the user actively uses client device 105, for which pull applications Application "A" 115 and Application "B" 120 and push applications Application "C" 125-1 and Application "D" 130-1 are authenticated 147 by multisite authentication server 145. As the user takes up client device 110, the user remains authenticated on push applications Application "C" 125-N and Application "D" 130-N, via multisite authentication server 145. However, the user has not yet been authenticated for either of Application "E" 135 and Application "F." Thus, when the user instantiates any of Application "C" 125-N, Application "D" 130-N, Application 'E' 135, or Application "F" 140 on client device 110, an updated user authentication request for the user on the primary application, e.g., Application "C," is received on authorization component 210 of multisite authentication server 145; the same may apply when the user instantiates either of Application "C" 125-N and/or Application "D" 130-N on client device 110. The updated user authentication request includes at least a client device ID for client device 110, upon which the respective application is instantiated. Processing may proceed to block 420.

Block 420 (Authentication Server: Transmit Client Device ID) may refer to transactional component 215 transmitting, to push server 155, one or more client device IDs corresponding to a respective user ID for all client devices from which user authentication requests have been received. As indicated previously, such client device IDs may be stored based on quantity of client device IDs or by timing of receipt of the respective client device IDs. Thus, as a minimum, block 420 includes transactional component 215 transmitting a client device ID for client device 110 to push server 155. Block 420 may further include transactional component 215 transmitting a client device ID for client device 105 and any other client devices on which the primary application, e.g., Application "C," and any dependent secondary applications have been previously authenticated, in terms of either quantity or time as described above.

Thus, when a user's activity on one of multiple devices on which the user has been authenticated, the multisite authentication server is so notified. Therefore, it is noted that, in at least some embodiments, authentication of the user's activity on a device does not have to be associated with any application. Further, when the user newly instantiates Application "E" 135 or Application "F" 140, or even Application "C" 125-N and/or Application "D" 130-N, on client device 110, multisite authentication server 145 may authenticate 137 Application "E" 135, authenticate 142 Application "F" 140, authenticate 129 Application "C" 125-N, and/or authenticate 139 Application "D" 130-N. Processing may proceed to block 425.

Block 425 (Push Server: Receive Client Device ID) may refer to ID receiving component 305 receiving one or more client device IDs from authentication server 145, for storage on device ID storage 160. ID receiving component 305 is configured, designed, and/or programmed to receive a client device ID from a most recently identified client device, i.e., client device 110. But, in accordance with at least some alternative embodiments, ID receiving component 305 may also receive a client device ID associated with a previously identified client device, i.e., client device 105, if the client device ID for such client device was received within a predefined quantity of previously identified client devices or within a predetermined amount of time. Processing may proceed to block 430.

Block 430 (Push Server: Push Update to Currently Used Device) may refer to push server 155 pushing content, e.g., messages, notifications, and/or updates, to client device 110. That is, having received the client device ID for the client device from which an authorization request has most recently been received, push server 155 is configured, designed, and/or programmed to push content to the corresponding client device, e.g., to one of the secondary applications corresponding thereto. Application "C" 125-N, on client device 110, receives push notification 127 and/or Application "D" 130-N, on client device 110, receives push notification 132.

Pragmatically, by the example embodiments described herein, the user may be spared the inconvenience of having the same content pushed to the same application that the user has running on multiple client devices.

However, because the user may toggle between client devices, sometimes within minutes of each other, example embodiments of updating a currently utilized device may also contemplate block 430 referring to push server 155 pushing content to client device 110 in a highlighted manner, e.g., "not read" format, or in a configuration that triggers an active notification, while also pushing the same content to client device 105 in a deemphasized manner, e.g., "read" format, or in a way that does not actively display a notification.

Further, with regard to the different formats in which content may be pushed, the content pushed to client device 110 may include a comprehensive notification of all content that has been updated since the user's activity was last acknowledged on any device. Thus, the user receives all updated content that may have been missed while in transit from one device to another, without having to dismiss the same notification twice on separate devices.

Thus, FIG. 4 shows an example processing flow for pushing content to only active client devices or pushing content to multiple devices in a manner that reduces a user's inconvenience.

Figure 5:
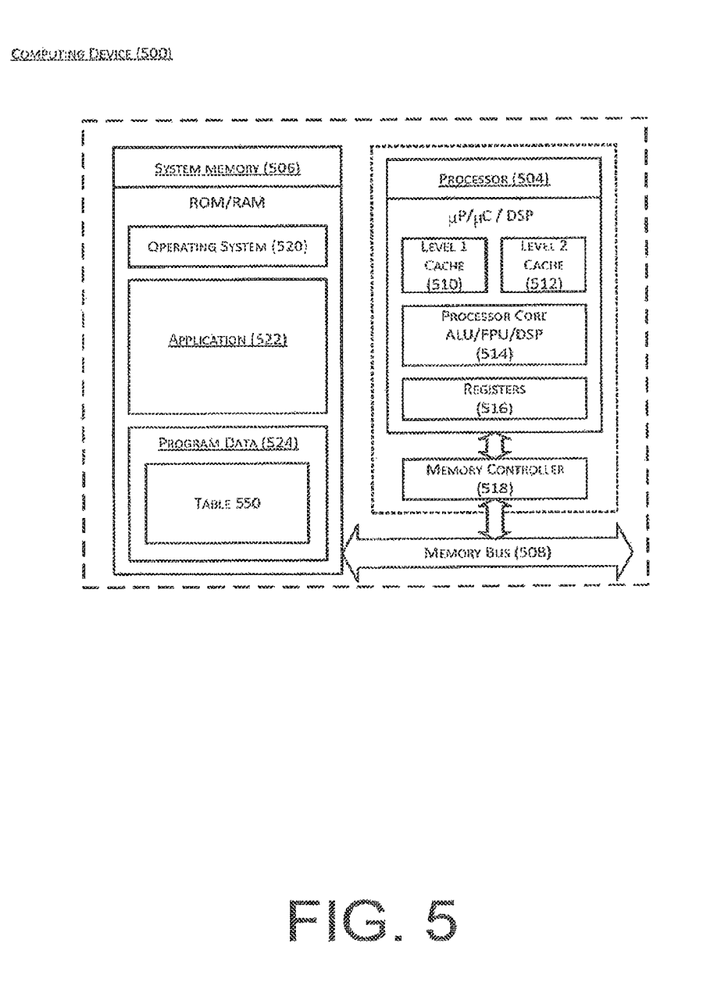
FIG. 5 shows a block diagram illustrating an example computing device by which various example solutions described herein may be implemented, arranged in accordance with at least some embodiments described herein.

FIG. 5 shows a block diagram illustrating an example computing device 500 by which various example solutions described herein may be implemented, arranged in accordance with at least some embodiments described herein.

More particularly, FIG. 5 shows an illustrative computing embodiment, in which any of the processes and sub-processes described herein may be implemented as computer-readable instructions stored on a computer-readable medium. The computer-readable instructions may, for example, be executed by a processor of a device, as referenced herein, having a network element and/or any other device corresponding thereto, particularly as applicable to the applications and/or programs described above corresponding to the configuration 100 for updating a currently utilized device.

In a very basic configuration, a computing device 500 may typically include one or more processors 504 and a system memory 506. A memory bus 508 may be used for communicating between processor 504 and system memory 506.

Depending on the desired configuration, processor 504 may be of any type including but not limited to a microprocessor (µP), a microcontroller (µC), a digital signal processor (DSP), or any combination thereof. Processor 504 may include one or more levels of caching, such as a level one cache 510 and a level two cache 512, a processor core 514, and registers 516. An example processor core 514 may include an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 524.

Application 522 may be configured to transmit or receive identification information pertaining to client devices 105 and/or 110, verify or validate such identifying data, and transmit device data as described previously with respect to FIGS. 1-4. Further, application 522 may be configured to detect the opening of a browser to a website and/or the activation or instantiation of a web-based application, and implement the logic for transmitting a client device ID to authentication server 145. Program data 524 may include a table 550, which may be useful for implementing actuation of appropriate components or modules as described herein.

System memory 506 is an example of computer storage media. Computer storage media may include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein may be implemented, e.g., hardware, soft and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for system configuration 100 via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing memory such as volatile and non-volatile memory, processors such as microprocessors and system generally includes one or more of a system unit housing, a video display device, a digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may con in usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. An authentication server, comprising:
a credentials component configured to receive an authentication request from a client device for an authentication service, wherein the authentication request includes a client device identifier (ID) associated with the client device;
a memory coupled to the credential component, wherein the memory is configured to store the client device ID;
an authorization component coupled to the memory, wherein the authorization component is configured to:
provide time-limited authentication credentials for a user of a primary application of the authentication service,
wherein the credential component is further configured to receive, from another device, an updated authentication request for the authentication service, in response to the primary application for which the time-limited authentication credentials were given or one or more dependent applications that depend on the primary application of the authentication service being utilized on the another client device,
wherein the updated authentication request includes a different client device ID associated with the another client device, and
wherein the memory is further configured to store the different client device ID; and
a transactional component coupled to the memory and authorization component, wherein the transactional component is configured to:
transmit the different client device ID associated with the another client device to a push server that corresponds to the authentication service; and
transmit the client device ID associated with the client device from which the authentication request has been received to the push server,
wherein the push server pushes content, formatted in one format, to the another client device and pushes the content, formatted in another format, to the client device, and
wherein overall system redundancy is eliminated or reduced and communication is enhanced.

2. The authentication server of claim 1, wherein the one or more dependent applications utilize the time-limited authentication credentials provided for the user.

3. The authentication server of claim 2, wherein:
the user is authenticated for the authentication service and the one or more dependent applications on multiple client devices,
the memory is further configured to store respective client device IDs associated with at least a subset of the multiple client devices from which the user has requested authorization on the primary application,
the transactional component is further configured to transmit the respective client device IDs associated with those of the subset of the multiple client devices from which updated authentication requests have been received within an amount of time to the push server, and
the push server pushes the content for the user on the primary application to those of the subset of the multiple client devices from which the updated authentication requests have been received within the amount of time.

4. The authentication server of claim 3, wherein the push server pushes the content, formatted in one format, to the client device having the client device ID of the client device from which the updated authentication request has most recently been received; and
pushes the content, formatted in another format, to the client device having the client device ID of the client device from others.

5. The authentication server of claim 2, wherein the transactional component is further configured to transmit the different client device ID associated with the another client device to a push server that corresponds to the one or more dependent applications that are to receive content on a push basis.

6. The authentication server of claim 2, wherein the transactional component is further configured to transmit the different client device ID associated with the another client device to a push server that corresponds to the one or more dependent applications on a particular frequency.

7. The authentication server of claim 2, wherein the push server requests the client device ID via an application program interface (API).

8. The authentication server of claim 2, wherein:
the user is authenticated for the authentication service and the one or more dependent applications on multiple client devices,
the memory is further configured to store respective client device IDs associated with at least a subset of the multiple client devices from which the user has requested authorization on the primary application, and
the transactional component is further configured to transmit the respective client device IDs associated with those of the subset of the multiple client devices from which updated authentication requests have been received within a quantity of devices among the multiple devices to the push server, and
the push server pushes the content for the user on the primary application to those of the subset of the multiple client devices from which updated authentication requests have been received within the quantity of devices among the multiple devices to the push server.

9. The authentication server of claim 1, wherein the authentication service includes a cloud-based authentication service, and wherein the primary application or the one or more dependent applications includes a cloud-based application.

10. The authentication server of claim 9, wherein the cloud-based application includes a widget that runs on the client device or the another client device.

11. The authentication server of claim 1, wherein the authentication server includes an OAuth server.

12. The authentication server of claim 1, wherein the user is authenticated for the authentication service and the one or more dependent applications on multiple client devices.

13. The authentication server of claim 1, wherein:
the user is authenticated for the authentication service and the one or more dependent applications on multiple client devices,
memory is further configured to store a client device ID for at least one client device from which the updated authentication request has most recently been received, and
the transactional component is further configured to transmit the client device ID for the at least one client device from which the updated authentication request has most recently been received to the push server.

14. An authentication server, comprising:
a credentials component configured to:
receive an authorization request from a client device, wherein the authorization request comprises a device identifier (ID) associated with the client device; and
receive a renewed authorization request from another client device, wherein the another client device is associated with another device ID and wherein the renewed authorization request comprises the another device ID
a memory coupled to the credential component, wherein the memory is configured to store the device ID and the another device ID;
an authorization component coupled to the memory, wherein the authorization component is configured to provide, in response to the receipt of the authorization request, credentials that enable multisite authorization for a user on a cloud based service and one or more dependent cloud based services that depend on the cloud based service; and
a transactional component coupled to the memory and the authorization component, wherein the transactional component is configured to:
transmit the device ID and the another device ID to a push server that corresponds to at least one of the cloud-based service or the one or more of the dependent cloud-based services,
wherein the another device ID facilitates a push service to the another client device associated with the another device ID, and the device ID facilitates the push service to the client device,
wherein the push service to the another client device transmits content, formatted in one format suitable for the cloud-based service and the one or more dependent cloud-based services for which the user is authorized using the another client device,
wherein the push service to the client device transmits the content, formatted in another format, and
wherein overall system redundancy is eliminated or reduced and communication is enhanced.

15. The authentication server of claim 14, wherein the push service to the client device transmits an indication that corresponding updates have been read elsewhere.

16. The authentication server of claim 14, wherein the credentials comprise tokens that include parameters that indicate an expiration time for the tokens.

17. The authentication server of claim 14, wherein the content includes a message, notification, or update.

18. The authentication server of claim 14, wherein the device ID includes internet protocol (IP) address associated with the client device, and wherein the another device ID includes IP address associated with the another client device.

19. A method, comprising:
responsive to receipt of an authorization request from a client device, providing, by an authentication server, credentials that enable multisite authorization for a user on a cloud-based service and one or more dependent cloud-based services that depend on the cloud-based service, wherein the authorization request comprises a device identifier (ID) associated with the client device;
receiving, by the authentication server, a renewed authorization request from another client device, wherein the another client device is associated with a another device ID, and wherein the renewed authorization request comprises the another device ID; and
transmitting, by the authentication server, the device ID and the another device ID to a push server that corresponds to at least one of the cloud-based service or the one or more of the dependent cloud-based services, wherein the another device ID facilitates a push service to the another client device associated with the another device ID, and the device ID facilitates the push service to the client device,
wherein the push service to the another client device transmits content, formatted in one format suitable for the cloud-based service and the one or more dependent cloud-based services for which the user is authorized using the another client device,
wherein the push service to the client device transmits the content, formatted in another format, and
wherein overall system redundancy is eliminated or reduced and communication is enhanced.

* * * * *